July 26, 1932.   P. F. SHARP   1,868,996
METHOD OF EGG PRESERVATION
Filed April 14, 1930
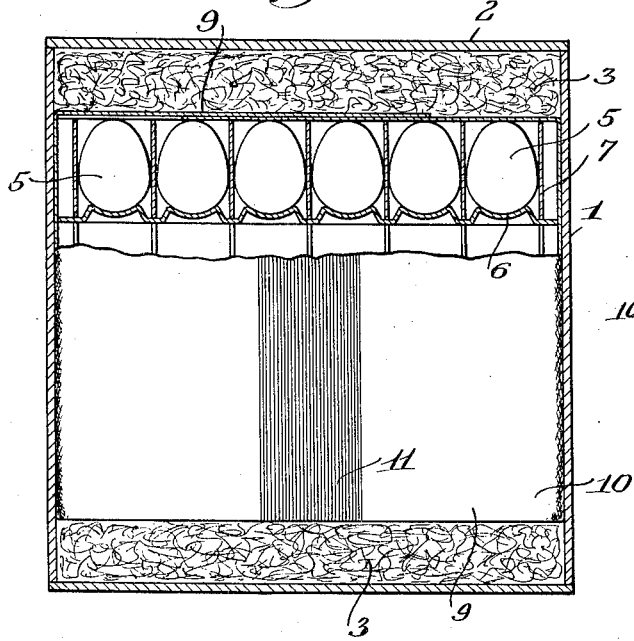
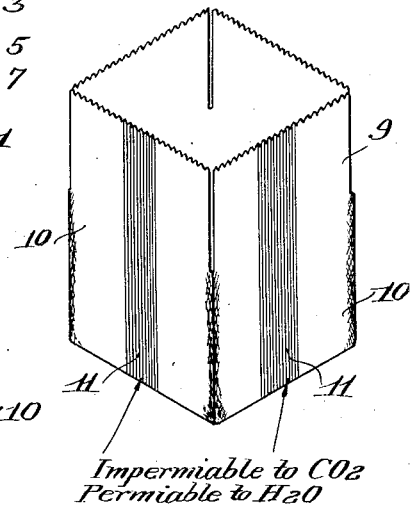
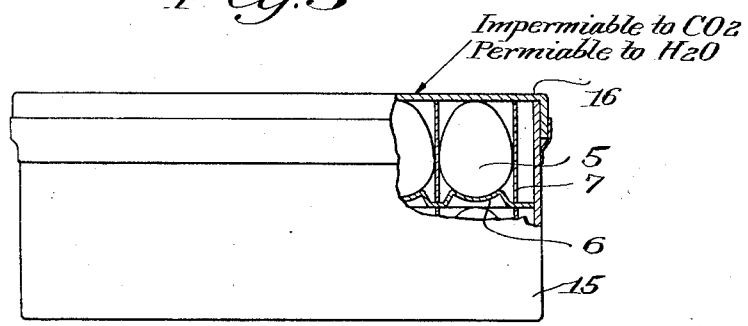
INVENTOR
Paul Francis Sharp
BY Robert V. Morse
his ATTORNEY Patented July 26, 1932

1,868,996

UNITED STATES PATENT OFFICE

PAUL FRANCIS SHARP, OF ITHACA, NEW YORK

METHOD OF EGG PRESERVATION

Application filed April 14, 1930. Serial No. 444,136.

This invention relates to the art of preserving eggs or similar foodstuffs, and is particularly concerned with providing a simple and relatively inexpensive commercial method for retarding the decomposition of eggs which may be utilized on the farm, in transit and in storage, whether or not cold storage conditions are available. The desirability of keeping eggs in an atmosphere of carbon dioxide under certain conditions has been demonstrated, but it is not generally commercially feasible to keep the egg under ideal conditions of $CO_2$ concentration and temperature from the time the egg is laid until it reaches the consumer. It is highly important that a simple method be available for restraining or retarding the decomposition at all times, for an egg may deteriorate more in a few days without care than it would in weeks or months under modern storage conditions. Under the present invention this is accomplished by placing the egg in a container which is permeable to $H_2O$ but impermeable to $CO_2$.

Eggs when laid contain considerable carbon dioxide, so that if the eggs were sealed up for example in a glass fruit jar, they would give off enough carbon dioxide to the air in the fruit jar to markedly retard some of the chemical deterioration of the eggs. It has been determined experimentally that they might, as a matter of fact, produce an atmosphere in the jar of from two to four percent of carbon dioxide,—at least enough to have a considerable retarding effect on the deterioration. But if the eggs are tightly sealed in a glass jar in this manner, they soon produce a humidity in the neighborhood of one hundred percent, and water condenses on the surface of the eggs. As soon as this happens, the eggs begin to mold, so that the mere process of placing eggs in an air and moisture tight container will not attain the desired result.

It will be seen however, that if the container is more or less impermeable to carbon dioxide, but will permit more freely the passage of a certain amount of moisture, then the carbon dioxide which the eggs themselves supply, can be utilized for their preservation and at the same time the growth of molds can be prevented. The essential thing, and the key to the present invention, is a material having selective properties which will permit the passage of water vapor much more readily than it will permit the passage of carbon dioxide, so as to substantially reduce the objectionable humidity while at the same time substantially retarding the passage of carbon dioxide,—thus building up a fair percentage of the preservative gas within the container, yet without encouraging mold.

One of the main things which is necessary in a film to retard carbon dioxide is that it must have no mechanical holes. Paper bags or liners impregnated with a waterproof material have been used in packing eggs, which at first sight appeared to be impermeable to both moisture and carbon dioxide. They are, however, permeable to both, due to holes and flaws characteristic of the material, thru which the carbon dioxide diffuses as readily as the water vapor. Such materials as have been used, if made actually impermeable to carbon dioxide, would also have been equally impermeable to moisture, which would have produced moldy eggs. It is essential that the film be substantially gas tight and at the same time have the selective quality of passing the moisture while retaining the carbon dioxide. It is not necessary that the selectivity be absolute, but I will point out, by way of example, various materials that possess such selectivity in a sufficient degree.

To assist in understanding the invention, I will first point out that a film of water itself will show some retarding action to the passage of carbon dioxide, even though carbon dioxide is soluble to a certain extent in water. For the carbon dioxide to pass thru a water film, it must first dissolve; it does not diffuse as a gas thru a porous material. On the other hand, water can of course pass thru a water film. This illustrates the difference in action.

The water film, of course, is not commercially feasible or desirable, but I have found that a film made from say 80% glycerine and 20% water mixture has quite desirable properties. The percentages are merely illustrative, as the precise proportions are not important provided the mixture will not dry up too fast when applied to the paper, wood or other porous material of the container. In other words, it is essential to maintain a film, and if the mixture were nearly all water it might evaporate.

Water will be taken up by the glycerine film on one side and will evaporate on the other,—thus the passage of the water is accomplished. The carbon dioxide, on the other hand, is quite insoluble in such a solution; consequently, its passage thru the film is very slow. While I have cited glycerine, any other material which will absorb water to a considerable extent and hold it, can be used for impregnating the walls of the container, which is generally of wood or paper. Of course the entire container need not be impregnated, provided that there is sufficient impregnated area to transmit the moisture,— and the rest of the container may be made impermeable. While I have cited glycerine as an example, it will be obvious that any other hygroscopic material may be used, of which there are innumerable examples, such as sugar solutions, karo corn syrup, molasses, calcium chloride solutions, and other salts like calcium chloride; also combinations of casein, alkali, water and glycerine may be used. There are also sheet materials, such as some of the cellophane or cellulose products which are not impervious to moisture but substantially retain gases.

While my invention is primarily a method of packing or preserving eggs to retard deterioration, and as such is broadly applicable to all sorts of containers, provided they are constructed with the proper materials having the differentiating function described, for the purposes of illustration I will describe in detail one or more specific embodiments or applications of the method, it being understood that they are merely by way of example and that the method is not limited to the particular forms shown.

Referring now to the drawing,—Fig. 1 is a side elevation partly in section of an egg crate provided with an impervious paper liner having a selective strip or window embodying the invention; Fig. 2 is a detail perspective view of the bag or liner; Fig. 3 illustrates another form of container embodying the invention.

Taking up first Fig. 1 and Fig. 2, there is shown an ordinary wooden egg crate 1 having a cover 2, and also having at the top and bottom a layer of excelsior 3, to cushion the eggs 5. The eggs 5 are carried on pulp fiber trays 6, and are separated from each other by the usual paper cross-strips 7 arranged to form individual cells for the eggs as in common practice. The eggs 5, packed as stated, with their trays and spacing members, are all enclosed in a bag or liner 9 which is shown partly in section and partly in elevation in Fig. 1 and in more detail (before folding and sealing) in Fig. 2. This envelope or bag 9 is principally made of impervious material 10, that is, material impervious to both $CO_2$ and moisture; as for example, paper containing a layer of or impregnated by waxy mixtures, oils, asphalt, rubber, metal foils or metal finished papers, aluminum paints, or any other impervious coating material or sheet material,—except that certain portions, which I have shown as shaded strips 11 in Fig. 1 and Fig. 2 are impregnated or constructed of a differentiating material such as I have described, which is more permeable to moisture than to carbon dioxide.

I have shown the transfer areas 11 in the form of strips because that form is somewhat better adapted to the practical requirements of paper manufacture, but any other form of window may be used, or the entire bag may be impregnated with or constructed of a differentiating material for passing the moisture and retaining the $CO_2$ as described. The most desirable proportion or area of the permeable part to the impermeable part or area,—that is, the ratio to best control the moisture loss, will vary according to the materials employed. After the eggs are packed, the top of the bag 9 is folded and sealed with a suitable adhesive, and reenforced corners may be applied to the folded bag if desired to aid in sealing.

In Fig. 3 another form is illustrated, consisting of a box or container 15 having a tight cover or lid 16, and containing eggs 5 arranged as described before. In this case the walls of the container 15 are made impervious to both moisture and $CO_2$, as for example being made of metal, or wood impregnated with vaseline, while the cover 16 is made of wood impregnated with a differentiating material as described, capable of passing the moisture and retaining $CO_2$. In such a box for example, under carefully checked laboratory conditions, quite a preserving effect on the eggs was evidenced as compared with control eggs which were stored in the ordinary manner.

It will be understood of course that $CO_2$ may also be introduced artificially into the container if desired. While I have in the foregoing described certain specific applications of the invention, it will be understood that they are merely by way of example to make clear the principles thereof, and that the invention is not limited thereto and is susceptible to various modifications and adaptations as will be apparent to those skilled in the art without departing from the scope of the invention as set forth in the following claim.

I claim:

The method of preserving eggs which consists in enclosing them in a container permeable to moisture and relatively impermeable to carbon dioxide, and relying on the carbon dioxide released by the eggs themselves to increase the carbon dioxide content of the atmosphere around them to retard decomposition.

In witness whereof I have hereunto set my hand this 11th day of April, 1930.

PAUL FRANCIS SHARP.